US007793885B2

(12) United States Patent
Anderton et al.

(10) Patent No.: US 7,793,885 B2
(45) Date of Patent: Sep. 14, 2010

(54) LANDING GEAR SUPPORT (75) Inventors: John Michael Anderton, Cossington (GB); Paul Anthony Cooper, Bristol (GB)

(73) Assignee: Airbus UK Limited, Bristol (GB)

( * ) Notice: Subject to any disclaimer, the term of this patent is extended or adjusted under 35 U.S.C. 154(b) by 12 days.

(21) Appl. No.: 11/222,680

(22) Filed: Sep. 9, 2005

(65) Prior Publication Data

US 2006/0060700 A1    Mar. 23, 2006

(30) Foreign Application Priority Data

Sep. 10, 2004    (GB)    ................. 0420191.9

(51) Int. Cl.
*B64C 25/10*    (2006.01)
(52) U.S. Cl. ................. 244/102 R; 244/102 A
(58) Field of Classification Search ................. 244/109, 244/102 R, 102 A, 104 R, 116, 110 E, 138 R, 244/121, 108, 102, 100 R
See application file for complete search history.

(56) References Cited

U.S. PATENT DOCUMENTS

| 3,136,506 | A | 6/1964 | Dowty |
| 4,392,623 | A | 7/1983 | Munsen et al. |
| 6,475,320 | B1 * | 11/2002 | Masugi ................. 156/189 |
| 6,679,452 | B1 | 1/2004 | Cottet et al. |
| 6,796,534 | B2 * | 9/2004 | Beyer et al. ................. 244/214 |

FOREIGN PATENT DOCUMENTS

| DE | 722977 | 7/1942 |
| GB | 580476 | 4/1945 |
| GB | 2 320 002 A | 6/1998 |

OTHER PUBLICATIONS

Definition of "lug" from www.dictionary.com.*
Figure representative of the prior art landing gear support assembly on a Lockheed L-1011 TriStar.

* cited by examiner

*Primary Examiner*—Benjamin P Lee
(74) *Attorney, Agent, or Firm*—Patterson Thuente Christensen Pedersen, P.A.

(57) ABSTRACT

A landing gear support assembly comprises a first support member, for example a gear rib, extending from the rear spar of an aircraft, and a pintle support assembly for holding a pintle on which a landing gear assembly may be supported. The pintle support assembly is distinct from the rear spar, and is arranged such that the longitudinal axis of a pintle is offset from the support member in a direction along the length of the rear spar. This arrangement may allow a stowed landing gear assembly to be wholly contained within the aircraft wing. The landing gear support assembly may contain additional structure, for example a composite false spar, for distributing loads to various regions of the rear spar. The additional structure may also form a torsion box which reduces the stress and shear force transmitted to the rear spar.

30 Claims, 4 Drawing Sheets

Figure 1

PRIOR ART

LANDING GEAR SUPPORT

BACKGROUND OF THE INVENTION

The present invention relates to an aircraft, and more particularly to a landing gear support assembly for an aircraft.

Aircraft landing gears on some aircraft are moveable between a deployed position (adopted for take-off and landing) and a stowed position (adopted during flight). The landing gear is often, therefore, retractably mounted on a landing gear support assembly located in the aircraft wings. The landing gear support assembly typically includes a pintle support assembly for holding a pintle on which the landing gear is rotatably supported. The landing gear support assembly is usually arranged such that the landing gear, when stowed, is mainly contained within the notional envelope defined by the wing. In recent years however, aircraft have been designed with increasingly thinner (lower thickness-chord ratio) wings. The arrangement of some existing landing gear support assemblies is such that the landing gear cannot be contained within these relatively thin wings. By way of example, in one such arrangement the pintle is supported on the shear centre of the support structure below the support structure, thus requiring a certain depth of wing.

It is also desirable for the landing gear support assembly to transfer the loads from the landing gear into the aircraft structure in a manner such that the landing gear support assembly, and the structural components surrounding it, need not be unduly heavy. In an aircraft of the prior art, the spar associated with the landing gear support assembly has a locally increased cross-sectional area to cope with the high loads in the region of the landing gear support assembly. Such a spar is therefore more difficult to manufacture than is desirable. Also it would be desirable to reduce the mass of the spar and/or the landing gear support assembly.

Moreover, the general desire to reduce mass in aircraft design has caused there to be a motivation to manufacture an increasing number of aircraft components from composite materials. However, many existing landing gear support assemblies are unsuitable for use with such composite materials due to their geometry and nature of the loads occurring during use.

U.S. Pat. No. 4,392,623 describes a landing gear support assembly in which a pintle is supported at one end on the rear spar and at the other end on a landing gear support beam, which extends from the rear spar to the fuselage. The provision of a landing gear support beam that extends from the rear spar to the fuselage significantly adds to the bulk and mass of the wing. Furthermore, the arrangement illustrated in U.S. Pat. No. 4,392,623 would not be suitable for manufacture in composite materials, as a result of the complicated geometry required of the various moving components, without significant modification that would probably add further weight.

U.S. Pat. No. 6,679,452 acknowledges and illustrates (in FIG. 2 of U.S. Pat. No. 6,679,452) a prior art landing gear support assembly, in which pintle supports are located on a gear rib (referred to in U.S. Pat. No. 6,679,452 as a trunnion support beam) and the rear spar respectively. Although this arrangement presents a solution different from the arrangement disclosed in U.S. Pat. No. 4,392,623, the landing gear support assembly acknowledged in U.S. Pat. No. 6,679,452 suffers from various disadvantages. During use, significant loads are transferred through the gear rib and the rear spar pintle support, directly into the rear spar at positions close to each other, thereby creating a high stress concentration in this region of the rear spar. Thus, it is necessary to locally increase the thickness of the rear spar, thereby increasing the weight of the rear spar and production costs. Furthermore, the prior art described in U.S. Pat. No. 6,679,452 is of limited application when considering how to design a predominately composite material wing box, because it is particularly difficult to manufacture a sufficiently robust rear spar pintle support using composite materials, as a result of the need to provide a pintle support directly on the rear spar. In addition, composite materials can be relatively inefficient at redistributing the loads within the structure. A landing gear support assembly of the arrangement disclosed in U.S. Pat. No. 6,679,452 would, therefore, generate even higher stress concentrations in the rear spar, if manufactured using composite materials.

Figure 1:
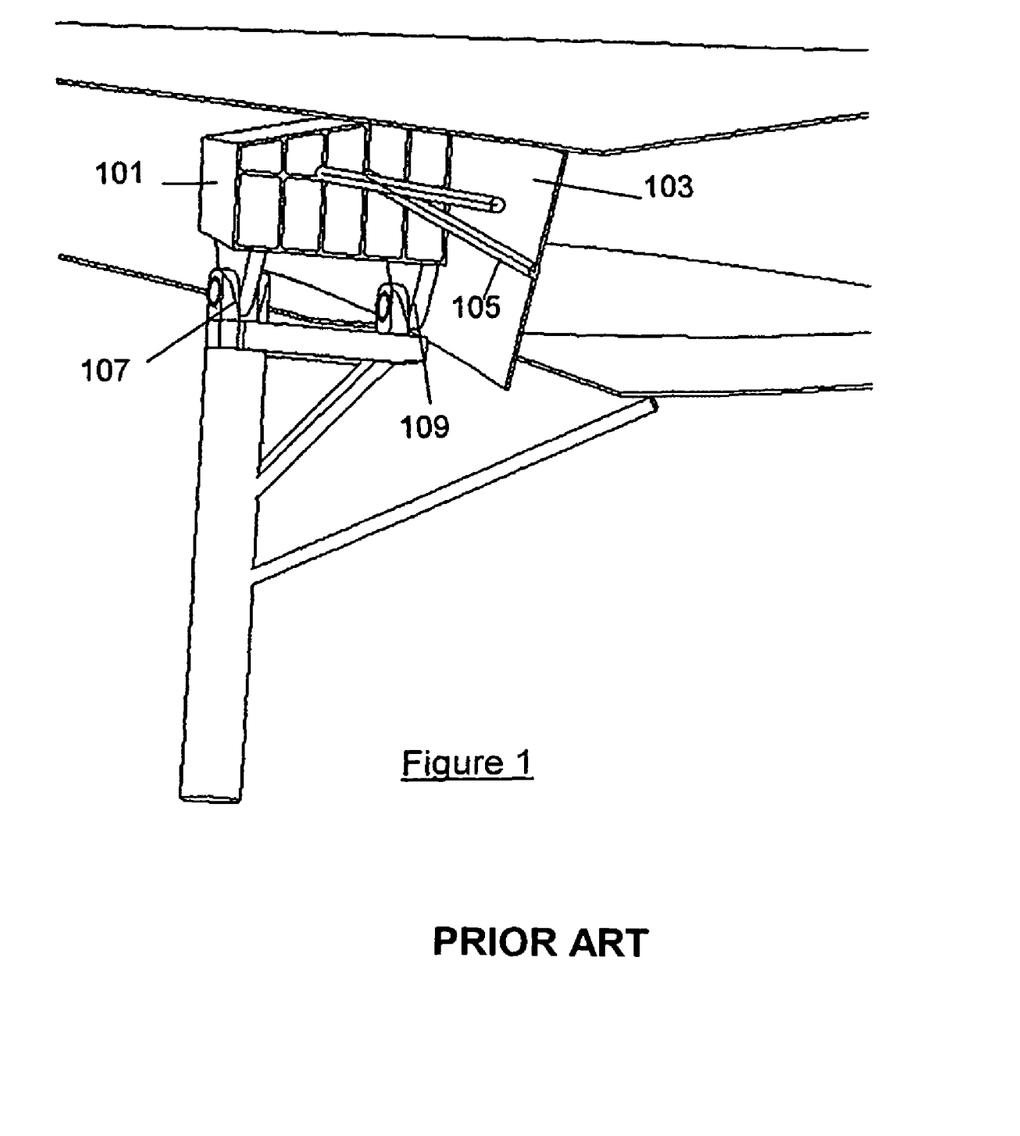
FIG. 1 is a landing gear assembly of the prior art.

FIG. 1 illustrates a further landing gear support assembly representative an arrangement used in the prior art on a Lockheed L-1011 TriStar aircraft. In that arrangement a cantilever beam, in the general form of a gear rib 101, is mounted on and supported by the rear spar 103. Connecting rods 105 extend between the cantilever beam and the fuselage. The loads transmitted through the pintle supports 107, 109 during use, are therefore spread between the rear spar and the fuselage, via the cantilever beam and connecting rod arrangement, respectively. This arrangement may therefore present a lower mass solution than the prior art arrangements described above. However, the pintle of the landing gear assembly is located on the underside of, and in the plane of, the gear rib. The particular arrangement of the pintle is such that the invention is not readily applicable to an aircraft having relatively thin wings as the notional envelope defined by the wing must be of a sufficient thickness to wholly contain the landing gear assembly in the stowed position. For example, the provision of the connecting rods restricts the possible positioning of the landing gear assembly when in the stowed position. Furthermore, the longitudinal axis of the pintle is not located in the same plane as the neutral axis of the rear spar. This may lead to a significant stress imbalance in the landing gear support assembly.

It is an object of the present invention to provide an improved landing gear support assembly that mitigates at least some of the above-mentioned disadvantages of the prior art.

SUMMARY OF THE INVENTION

According to the invention there is provided an aircraft wing comprising a rear spar, and a landing gear support assembly, the landing gear support assembly comprising a first support member extending from the rear spar, and a pintle support assembly for holding, in use, a pintle on which a landing gear assembly may be rotatably supported, whereby in use loads may be transmitted from the landing gear to the pintle support assembly and then via the first support member to the rear spar, wherein the pintle support assembly is distinct from the rear spar, and is arranged such that, in use, the longitudinal axis of a pintle held by the pintle support assembly is offset from the support member in a direction along the length of the rear spar. Since the pintle support assembly is arranged such that, in use, the longitudinal axis of the pintle is offset from, for example by being positioned to the side of, the connecting member, the landing gear, when it is in the stowed position, can be contained within a relatively thin wing. Furthermore, the pintle axis may, as a result of the structural arrangement of the wing, be located in the same plane as the neutral axis of the rear spar, thereby improving the stress distribution in the rear spar.

Moreover, it will be understood that in use no significant loads are transferred directly between the pintle support assembly and the rear spar. The pintle support assembly is preferably spaced apart from the rear spar. In particular, those parts (for example, lugs) of the pintle support assembly that in use support the pintle, are preferably spaced apart from the rear spar. Thus, the potentially large localised shear stresses associated with the pintle support assembly need not be directly withstood by the rear spar. The rear spar need not therefore be strengthened/thickened locally as much as in certain prior art arrangements and may therefore be readily manufactured from composite materials.

Also, the pintle support assembly is distinct from the rear spar, reducing the need for complex geometry in the rear spar (such geometry for example being needed either to form at least a part of the pintle support assembly or to accommodate attachments enabling the fixing of the pintle support assembly directly onto the rear spar), again thereby allowing the rear spar to be more easily manufactured using a composite material.

The pintle support assembly is preferably arranged such that, in use, the longitudinal axis of a pintle held by the pintle assembly is offset from the support member in a direction parallel to the length of the rear spar. For example, the longitudinal axis of the pintle may be offset to one side of the first support member. The pintle is advantageously offset from the notional cylinder having a cross-sectional shape that envelopes the first support member, the cylinder's longitudinal axis being perpendicular to the upper wing skin of the wing. The pintle support assembly preferably extends from the first support member. The pintle support assembly may comprise two lugs that in use support the pintle. The support member preferably extends from the rear spar in a direction that is along the chordwise direction.

There may be provided a first connecting member. In one embodiment of the present invention the first connecting member extends substantially parallel to the rear spar. In such a case, loads may be transmitted, in use, from the first support member via the first connecting member and a further structural element to the first region of the aircraft. In another embodiment however the direction in which the first connecting member extends defines an acute angle with the length of the rear spar. The first connecting member may extend from the first support member to the rear spar. In such a case, loads are transmitted, in use, from the first support member via the first connecting member to the region of connection between first connecting member and the rear spar. The first connecting member may alternatively extend from the first support member towards the fuselage. The first connecting member may be arranged to be connected to the fuselage of the aircraft. Thus said first region (the region to which loads are transmitted in use from the first connecting member) may be located on the fuselage. Preferably, however, said first region is located on the rear spar. Said first region is advantageously spaced apart from the region of contact between the rear spar and the first support member. Thus, the loads transmitted into the rear spar may advantageously be spread out, thereby reducing stress concentrations in this region of the rear spar. The first connecting member may be in the form of a false spar.

There may be provided a second connecting member. In one embodiment of the present invention the second connecting member extends substantially parallel to the rear spar and to the first connecting member. In such a case, loads may be transmitted, in use, from the first support member via the first and second connecting members and a further structural element to the first and second regions of the aircraft. The direction in which the second connecting member extends may define an acute angle with the length of the rear spar. The second connecting member may extend from the first support member to the rear spar. In such a case, the second region (the region to which loads are transmitted in use from the second connecting member) is advantageously spaced apart from the region of contact between the rear spar and the first support member. Advantageously, the second region is spaced apart from the first region (the region to which loads are transmitted in use from the first connecting member). The second regions may alternatively be the same as the first region, so that in use loads are transmitted from both the first and second connecting members to the same region on the aircraft.

There may be provided a second support member, which enables loads to be reacted into the rear spar in two spaced apart regions. The second support member is preferably substantially parallel to the first support member. In the case where there are provided one or more connecting members for reacting loads into the rear spar, such loads may be reacted into the rear spar via the second support member (so that said first region and/or said second region is/are the region(s) to which loads are transmitted in use from the first connecting member and/or the second connecting member). In such cases, it will be understood that the first connecting member and/or second connecting member may be wholly spaced apart from the rear spar. For example, the first connecting member may connect the first support member to the second support member. The support member(s) of the invention may be in the form of a rib in the wing. For example, the first support member may be considered as forming a gear rib.

It is preferred for the loads from the landing gear to be distributed over a plurality of spaced-apart regions on the rear spar. Such regions may include, where appropriate, the connection points between the rear spar and (i) the first support member, (ii) the second support member, (iii) the first connecting member and (iv) the second connecting member. In certain embodiments of the invention, the structure provided to transmit and spread loads indirectly into the rear spar may embody a relatively low-mass design, as a result of the lesser need for local thickness variations along the rear spar. The mass saving may be particularly beneficial when the rear spar is made from composite materials as the need for local thickness increase can as a result of restrictions in the use of composite materials require a greater proportional increase in mass than in the case of a metal spar structure.

There may be provided a shear-load-reducing structure. The provision of such a shear-load-reducing structure allows shear forces resulting from loads on the landing gear to be reacted through structure of the wing other than the rear spar, with the consequent advantage that the rear spar can be designed to withstand relatively lower loads, potentially leading to a weight saving. The shear-load-reducing structure may be in the form of a framework defined by various load bearing structures in the wing. The framework may have one or more sides, for example faces, defined by various load bearing structures in the wing. The shear-load-reducing structure may for example define a torsion box. The torsion box may be in the form of an open box structure in which there is no load-bearing structure across at least one face of the torsion box. For example, one face of such an 'open box' structure could be formed by the first support member, whereas there might be no structural element for forming an opposite face of the box. Preferably, the torsion box is in the form of a closed box structure. Different structural parts of the wing may form one or more sides of the shear-load-reducing structure (for example one or more of the six faces of the structure when in the form of a closed cuboidal torsion box). Whilst, in certain cases, the provision of a closed box structure might represent a heavier solution than an open box structure it is believed that in thin composite wing structures, a closed box structure may actually allow greater weight saving than an open box structure. Preferably, the shear-load-reducing structure is distinct from the rear spar. The shear-load-reducing structure is preferably spaced apart from rear spar. Loads may be transmitted from the shear-load-reducing structure to the rear spar via the first support member and, if provided, the second support member.

The present invention has particular application in the case where the rear spar is manufactured substantially from composite material. Preferably, the wing includes wing skin manufactured from composite material. At least the majority (by volume) of the support member of the wing is also preferably made from composite material. Alternatively or additionally at least one component of the landing gear support assembly may be manufactured from titanium or aluminium or an alloy of either of those metals. For example, the pintle support assembly, or a part thereof, may be made from metal. The shear-load-reducing structure mentioned above is preferably substantially wholly defined by composite material parts.

The present invention is particularly applicable for aircraft with relatively thin wings. Thus, advantageously there is provided an aircraft wing having an average thickness to chord ratio of less than about 10%. The wing may have a thickness to chord ratio of less than 9%.

The wing of the present invention may be manufactured separately from the landing gear of the aircraft and the wing and landing gear may be provided separately from one another. The wing may however include the landing gear, in which case, the pintle support assembly then holds a pintle on which the landing gear assembly is rotatably supported. The landing gear may include a landing gear stay connected between a part of the leg of the landing gear and the rear spar. As such some loads will in use be transmitted from the landing gear to the rear spar via the stay. It will be appreciated however that the loads that the stay is arranged to withstand are preferably low in comparison to the loads that the landing gear support assembly is configured to withstand.

The first support member may be formed as a separate part and may be mechanically and/or chemically joined during the manufacture of the wing to the rear spar. As such the first support member and the pintle support assembly may be provided separately from other components of the wing. As such the present invention further provides a kit of parts for producing an aircraft wing in accordance with the invention as defined herein.

BRIEF DESCRIPTION OF THE DRAWINGS

By way of example, embodiments of the present invention will now be described with reference to the accompanying schematic drawings in which.

DETAILED DESCRIPTION OF THE DRAWINGS

Figure 2:
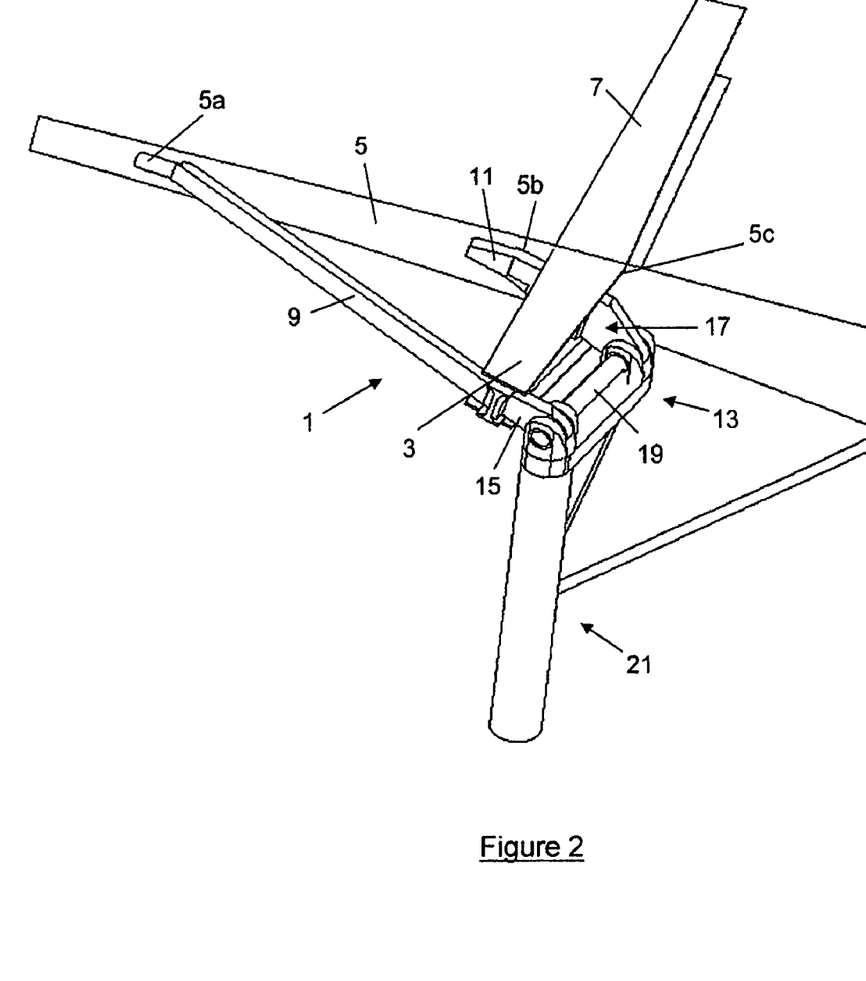
FIG. 2 is a landing gear assembly on an aircraft wing according to a first embodiment of the invention.

FIG. 2 shows part of an aircraft wing structure, according to a first embodiment of the invention. The structure includes a landing gear support assembly 1 comprising a titanium alloy gear rib 3 connected to a rear spar 5. The gear rib 3 extends along the longitudinal axis of a main wing rib 7 and may be considered as effectively forming an extension of the main wing rib 7. The landing gear support assembly 1 further comprises a first connecting member 9 extending from the tip of the gear rib 3 to a first region 5a on the rear spar and a second connecting member 11 extending from the region near the root of the gear rib 3 to a second region 5b on the rear spar, spaced apart from the first region 5a. The second region 5b is positioned between, and spaced apart from, the first region 5a and the region 5c at which the gear rib 3 is connected to the rear spar 5. Both the first and second connecting members 9, 11 are formed of composite material and are connected, and bonded, to the rear spar 5, which is also formed of composite material. The rear spar 5 has a generally smooth profile and is readily manufactured from composite materials using standard techniques in the art.

A pintle support assembly 13 comprising two lugs 15, 17 is attached to, and projects perpendicularly from the side of, the gear rib 3. The lugs 15, 17 are arranged to support a pintle 19 of a landing gear 21 (partially shown, in the deployed position). The axis of the pintle 19 is offset from the gear rib in the spanwise direction (along the length of the rear spar 5) and is thus spaced apart away from the vertical plane coinciding with the axis of the gear rib 3. Also, when viewing the wing in plan view (from above), the pintle is spaced apart from gear rib 3. As regards the vertical positioning of the pintle 9, it is positioned to be in line with the centre-line of the rear spar 5. The first and second lugs 15, 17 are integrally formed with the first and second connecting members 9, 11 respectively. The arrangement of the pintle support assembly 13, pintle 19 and the landing gear 21 is such that the landing gear 21 is wholly contained within the wing structure when the landing gear is in the stowed position.

None of the pintle support assembly 13 is directly in contact with the rear spar 5. In use, when the landing gear assembly 21 is in its deployed position, loads, for example loads generated during braking of the wheels of the landing gear on landing, are transmitted through the leg of the landing gear 21 into the pintle support assembly 13 as loads including shear loads. These loads are then distributed to the rear spar 5 via the gear rib 3 (the main support member) and the two (subsidiary) connecting members 9, 11. As a result of the pintle support assembly 13 being spaced apart from the rear spar 5 and positioned close to the neutral axis of the rear spar 5, the shear loads transmitted into the rear spar 5 are low enough that the strengthening of the rear spar 5 in regions 5a, 5b, 5c of load input need not be significant. Thus, during use, no significant loads are transferred directly between the pintle support assembly 13 and the rear spar 5. There is therefore no requirement for the rear spar 5 to be designed to withstand the potentially large localised loads, for example resulting from shear loads, associated with the pintle support assembly 13. Hence, the rear spar 5 may be manufactured without sudden increases in cross-section, allowing it to be relatively light and readily manufactured from composite materials. In addition, manufacturing the rear spar from a composite material is also eased since there is no requirement for a cavity, or integrated pintle support attachment, in the rear spar 5.

Figure 3:
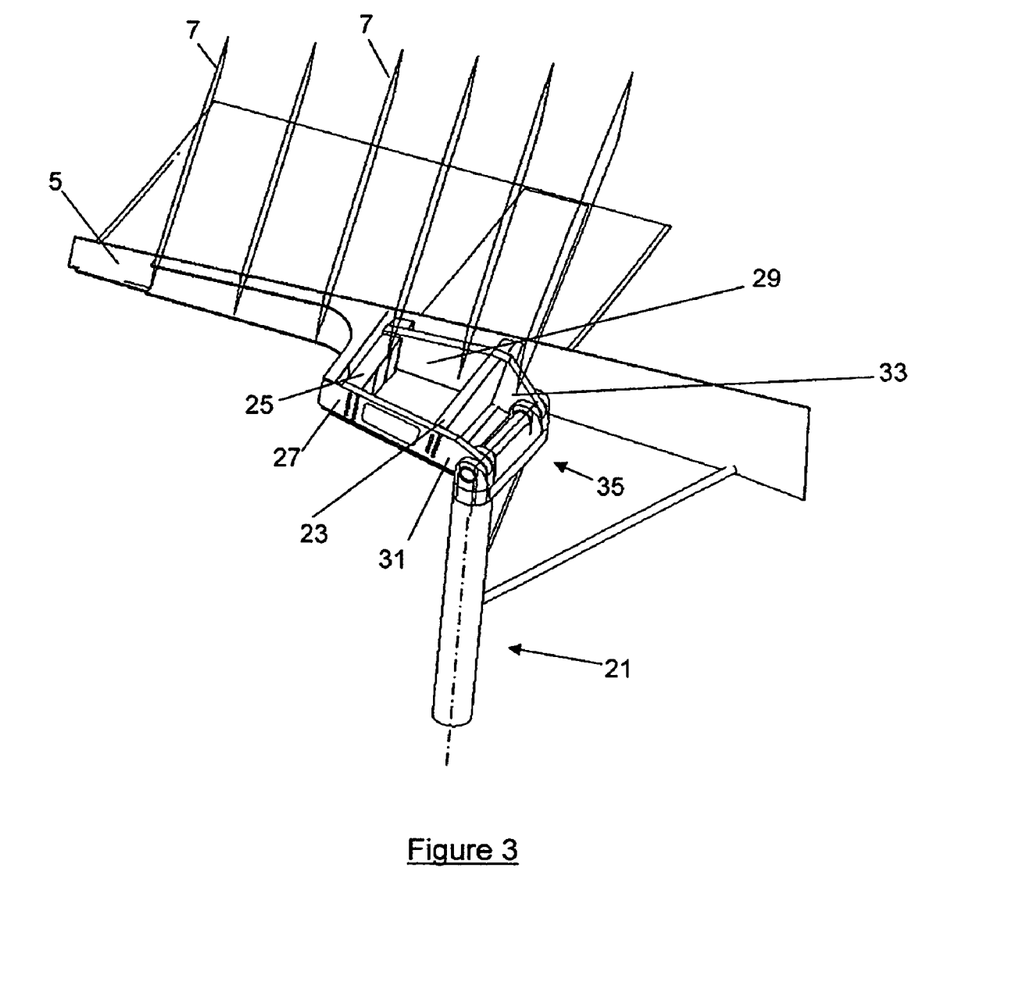
FIG. 3 is a landing gear assembly on an aircraft wing according to a second embodiment of the invention in which the wing skin over part of the landing gear assembly is not shown.

FIG. 3 shows an aircraft wing including a landing gear support assembly according to a second embodiment of the invention. First and second support members 23, 25 extend from a rear spar 5 of the wing (partially shown in FIG. 3, the wing skin being omitted for the sake of clarity). The support members 23, 25 extend at an acute angle to, and are offset from, the main wing ribs 7.

A first connecting member 27, extending in the same direction as the length of the rear spar 5 and being spaced apart therefrom, is attached to the end of both the first and second support members 23, 25. A second connecting member 29 is arranged approximately parallel to the first connecting member 27 and connects the first and second support members close to the point at which they extend from the rear spar 5. First and second lugs 31, 33 of a pintle support assembly 35 are integrally formed with the first and second connecting members 27, 29 respectively. The pintle support assembly 35 locates the pintle of the landing gear 21 closer to the upper surface of the wing than existing landing gear support assemblies. The pintle is located so that, during use, the landing gear 21, when in the stowed position, can be wholly contained within the wing structure.

Figure 4:
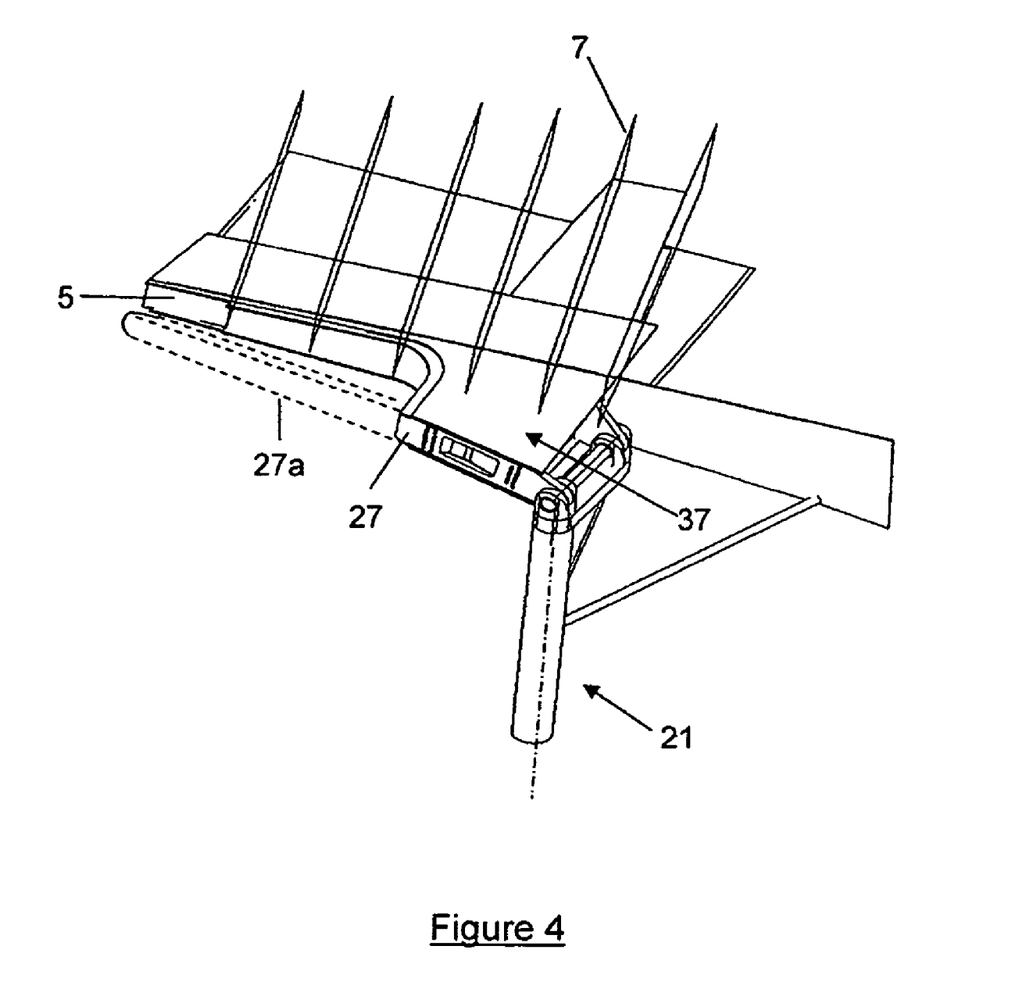
FIG. 4 is a landing gear assembly on an aircraft wing according to the second embodiment of the invention in which the wing skin over part of the landing gear assembly is shown.

FIG. 4 shows the landing gear support assembly of FIG. 3 with the wing skin shown attached. The support members 23, 25, connecting members 27, 29 and the wing skin 37 create a torsion box in the form of a closed box structure. In use, this significantly reduces the shear flow in each component of the structure in comparison with a single cantilever gear rib projecting from the rear spar (such as the prior art example illustrated in FIG. 1). Also, the closed box structure is stiffer, and has a higher fatigue life, than such a cantilever gear rib design. The lay up of the layers that form the composite wing skin 37 is chosen in consideration of the stiffness requirements of the torsion box formed. The average thickness to chord ratio of the wing shown in FIGS. 3 and 4 is about 9%. Therefore, the stiffness able to be achieved with the torsion box is relatively high given the relatively low thickness of the wing. The use of composite materials in this embodiment thus provides weight saving advantages over the use of conventional metal alloy materials.

The first connecting member 27 may optionally be connected to or be integrally formed with, a false spar 27a (shown in broken lines in FIG. 4). The false spar 27a extends towards, and is attached to the rear spar 5.

The loads generated, in use, by the landing gear 21 are distributed over a number of points on the rear spar 5, namely the connection points between the rear spar 5 and the false spar 27a (if provided), the first support member 23 and the second support member 25. Furthermore the support members 23, 25 are spaced apart by approximately two rib pitches in the spanwise direction. The rib(s) located therebetween are arranged to dissipate some of the stresses that are, during use, transmitted through the rear spar 5. This facilitates a lighter, and potentially less complex, rear spar.

Whilst the present invention has been described and illustrated with reference to particular embodiments, it will be appreciated by those of ordinary skill in the art that the invention lends itself to many different variations not specifically illustrated herein. For that reason, reference should be made to the claims for determining the true scope of the present invention. By way of example, certain variations to the above-described embodiments will now be described.

The closed box structure need not necessarily include the wing skin. Alternatively or additionally the false spar shown in FIG. 4 may extend to the fuselage.

Also, the gear rib of the first embodiment may be arranged to be sufficiently stiff and strong by itself to support a pintle support assembly to one side of the gear rib so that the first and second connecting members may be dispensed with. For example, the first and second support members could be dispensed with and replaced by a single support member. Alternatively, a support member comprised of two gear ribs positioned close together and joined at their tops and bottoms by the top and bottom wing skins of the wing may be provided.

The invention claimed is:

1. An aircraft wing comprising a rear spar, and a landing gear support assembly, wherein the
    landing gear support assembly comprises
    a first support member extending in a generally chordwise direction from the rear spar, and
    a pintle support assembly for-holding, in use, a landing gear assembly which is supported,
    by the pintle support assembly for rotation relative to the pintle support assembly about a pintle axis,
    the first support member supporting the pintle support assembly in such a manner that the pintle support assembly is cantilevered off of the first support member in a spanwise direction so that none of the pintle support assembly is directly in contact with the rear spar.

2. An aircraft wing according to claim 1, further comprising a first connecting member connected to the first support member and being so arranged that in use loads are transmitted from the first support member via the first connecting member to a first region of the rear spar.

3. An aircraft wing according to claim 2, further comprising a second support member extending from the rear spar and being so arranged that in use loads are transmitted from the first support member via the second support member to a region of the rear spar that is spaced apart, in the spanwise direction, from the region of contact between the rear spar and the first support member.

4. An aircraft wing according to claim 3, wherein a part of the wing defines a shear-load-reducing structure, which in use is subjected to shear loads resulting from the loads on the landing gear, and is arranged to transmit those shear loads at a reduced level to the rear spar.

5. An aircraft wing according to claim 4, further comprising a wing skin and wherein the first and second support members, and the first connecting member each form a respective side of the shear-load-reducing structure, the sides defining a torsion box, which is spaced apart from the rear spar, and
    the sides of said torsion box include at least two pairs of two spaced apart and parallel sides, a side of one pair being transverse to a side of the other pair and transverse to the wing skin.

6. An aircraft wing according to claim 2, further comprising a second connecting member connected to the first support member and being so arranged that in use loads are transmitted from the first support member via the second connecting member to a second region of the rear spar.

7. An aircraft wing according to claim 6, wherein the first and second regions are centered on the rear spar at positions that are spaced apart in the spanwise direction.

8. An aircraft wing according to claim 6, wherein
    the pintle support assembly comprises a pair of lugs, which extend from the first support member in a generally spanwise direction, and which connect the pintle support assembly to the first support member, and
    said first support member, said first connecting member, said second connecting member, and said pair of lugs are disposed on a common plane.

9. An aircraft wing according to claim 6, further comprising a second support member extending from the rear spar and being so arranged that in use loads are transmitted from the first support member via the second support member to a region of the rear spar that is spaced apart, in the spanwise direction, from the region of contact between the rear spar and the first support member.

10. An aircraft wing according to claim 9, wherein a part of the wing defines a shear-load-reducing structure, which in use is subjected to shear loads resulting from the loads on the landing gear, and is arranged to transmit those shear loads at a reduced level to the rear spar.

11. An aircraft wing according to claim 10, wherein the first and second support members, and the first connecting member each form a respective side of the shear-load-reducing structure.

12. An aircraft wing according to claim 11, wherein the respective sides of the shear-load-reducing structure define a torsion box.

13. An aircraft wing according to claim 11, wherein the second connecting member forms a side of the shear-load-reducing structure, the sides defining a torsion box, said torsion box being disposed substantially in the same plane as the longitudinal axis of the rear spar.

14. An aircraft wing according to claim 13, further comprising a wing skin arranged to form a further side of the shear-load-reducing structure, the wing skin extending between the first and second support members, the sides defining a torsion box.

15. An aircraft wing according to claim 1, further comprising a second support member extending from the rear spar and being so arranged that in use loads are transmitted from the first support member via the second support member to a region of the rear spar that is spaced apart, in the spanwise direction, from the region of contact between the rear spar and the first support member.

16. An aircraft wing according to claim 15, wherein a part of the wing defines a shear-load-reducing structure, which in use is subjected to shear loads resulting from the loads on the landing gear, and is arranged to transmit those shear loads at a reduced level to the rear spar.

17. An aircraft wing according to claim 16, further comprising a wing skin arranged to form at least one side of the shear-load-reducing structure, the wing skin extending between the first and second support members.

18. An aircraft wing according to claim 17, wherein
said wing skin comprises an upper wing skin and a lower wing skin, and
the shear-load-reducing structure is spaced apart from the rear spar and defines a torsion box having a multiplicity of sides, including:
a first upper side being defined by the upper wing skin,
a second side being defined by said first support member,
a third side being defined by said second support member, and
a fourth lower side being defined by the lower wing skin, wherein
said first side is spaced apart from and substantially parallel with, said fourth side, said second side is spaced apart from said third side in the spanwise direction, said second side is substantially parallel with said third side, said first side is substantially transverse to said second side, and said third side is substantially transverse to said fourth side.

19. An aircraft wing according to claim 1, wherein
the rear spar is manufactured substantially from composite material.

20. An aircraft wing according to claim 1, wherein the wing has an average thickness to chord ratio of less than 1:10 and the arrangement of the pintle support assembly enables the wing to have a low thickness to chord ratio.

21. An aircraft wing according to claim 1, wherein the pintle support assembly comprises a pair of lugs, which extend from the first support member in a generally spanwise direction, and which connect the pintle support assembly to the first support member.

22. An aircraft wing according to claim 21, wherein the pintle support assembly is so arranged that, in use, loads associated with the pintle support assembly are transferred from the pintle support assembly to the first support member via the pair lugs and then from the first support member to the rear spar, so that such loads are not directly transferred from the lugs to the rear spar.

23. An aircraft wing according to claim 1, wherein the rear spar has a spanwise neutral axis at which internal stresses in the spar are a minimum, and the pintle support assembly is arranged such that the pintle axis is located in the same plane as the neutral axis.

24. A landing gear support assembly for installation in an aircraft wing comprising a rear spar, wherein the landing gear support assembly comprises
a first support member extending aft from the rear spar of the wing, and a pintle support assembly,
the pintle support assembly comprising a pair of lugs, said pair of lugs including a forward lug and an aft lug, said lugs defining opposing ends of the pintle support assembly and extending in a generally spanwise direction from the first support member, said pintle support assembly for holding, in use, a landing gear assembly, which is supported, by the lugs of the pintle support assembly for rotation, relative to the pintle support assembly, about a pintle axis.

25. A kit of parts for attaching a landing gear assembly to a rear spar of an aircraft wing, the kit of parts comprising
a first support member extending in a generally chordwise direction from the rear spar,
a first connecting member coupled to the first support member at a first position and a second connecting member coupled to the first support member at a second position spaced apart from the first position in the chordwise direction, each connecting member being so arranged that in use loads are transmitted from the first support member via the connecting member to a region of the rear spar that is spaced apart, in the spanwise direction, from the region of contact between the rear spar and the first support member, and
a pintle support assembly supported by the first support member, said pintle support assembly for holding, in use, a landing gear assembly, which is supported by the pintle support assembly for rotation, relative to the pintle support assembly, about a pintle axis,
wherein the kit of parts is so arranged that, once the landing gear assembly is so attached to the rear spar of the aircraft wing:
a) the pintle support assembly is spaced apart from the rear spar of the wing by means of the first support member, and
(b) shear loads resulting from the loads on the landing gear are transmitted at a reduced level via the first and second connecting members to the rear spar.

26. An aircraft wing comprising an upper wing skin, a lower wing skin, a rear spar, and a landing gear support assembly, wherein
the landing gear support assembly comprises a torsion box, the torsion box being formed by
(a) at least a part of the wing skin,
(b) at least a part of a first support member extending in a generally chordwise direction from the rear spar, (c) at least a part of a second support member extending in a generally chordwise direction from the rear spar, and (d) a connecting member spaced apart from the rear spar and extending in a generally spanwise direction between the first support member and the second support member, the connecting member thereby connecting the first support member and the second support member, whereby the first support member defines an outboard side of the torsion box, the second support member defines an inboard side of the torsion box, and the connecting member defines a further side of the torsion box, the landing gear support assembly comprises a pintle support assembly for holding, in use, a landing gear assembly, which is supported, by the pintle support assembly for rotation, relative to the pintle support assembly, about a pintle axis, the pintle support assembly is arranged such that, in use, the pintle axis is offset from the first support member in a spanwise direction, and said torsion box is spaced apart from the rear spar and is so arranged that, in use, shear loads caused by loads on the landing gear are transmitted from the pintle support assembly to the rear spar via the torsion box, thereby reducing and/or spreading out the shear loads sustained by the rear spar.

27. An aircraft wing comprising a rear spar, and a landing gear support assembly, wherein the landing gear support assembly comprises a first support member extending in a generally chordwise direction from the rear spar, a pintle support assembly comprising at least one lug extending in a generally spanwise direction from the first support member, said pintle support assembly for holding, in use, a landing gear assembly, which is supported, by the pintle support assembly for rotation about a pintle axis, a first connecting member connected to the first support member and being so arranged that in use loads are transmitted from the first support member via the first connecting member to the rear spar, the wing has an average thickness to chord ratio of less than 1:10, the rear spar has a spanwise neutral axis at which internal stresses in the spar are at a minimum, and said first support member, said first connecting member, said at least one lug, the pintle axis, and the neutral axis of the rear spar are all disposed on a common plane.

28. An aircraft wing according to claim 27, wherein the pintle support assembly is arranged such that, in use, the pintle axis is offset from the support member in a spanwise direction.

29. An aircraft wing according to claim 27, wherein the pintle support assembly is spaced apart from the rear spar by means of the first support member.

30. An aircraft wing according to claim 27, wherein the pintle support assembly is so arranged that, in use, loads associated with the pintle support assembly are transferred from the pintle support assembly to the first support member via said at least one lug and then from the first support member to the rear spar, so that such loads are not directly transferred from a lug to the rear spar.

* * * * *